(12) United States Patent
Yang et al.

(10) Patent No.: US 11,985,389 B2
(45) Date of Patent: May 14, 2024

(54) OBJECT OR REGION OF INTEREST VIDEO PROCESSING SYSTEM AND METHOD

(71) Applicant: Avago Technologies International Sales Pte. Limited, Singapore (SG)

(72) Inventors: Zhijie Yang, Irvine, CA (US); Xuemin Chen, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/372,636

(22) Filed: Jul. 12, 2021

(65) Prior Publication Data
US 2023/0010078 A1    Jan. 12, 2023

(51) Int. Cl.
*H04N 21/4728*    (2011.01)
*H04N 21/431*    (2011.01)
*H04N 21/472*    (2011.01)

(52) U.S. Cl.
CPC ..... *H04N 21/4728* (2013.01); *H04N 21/4316* (2013.01); *H04N 21/47217* (2013.01)

(58) Field of Classification Search
CPC .......... H04N 21/4728; H04N 21/4316; H04N 21/47217; G06K 9/6253; G06T 7/11; G06T 7/70; G06T 2207/10016; G06T 2207/20092; G06T 2207/20132; G06V 20/41
See application file for complete search history.

(56) References Cited

U.S. PATENT DOCUMENTS

| | | | |
|---|---|---|---|
| 7,015,976 B1* | 3/2006 | Orr | H04N 21/440272 348/E5.062 |
| 7,536,706 B1* | 5/2009 | Sezan | H04N 21/234318 725/135 |
| 9,473,819 B1* | 10/2016 | Bostick | H04N 21/4788 |
| 10,313,759 B1* | 6/2019 | Waggoner | H04N 21/47217 |
| 10,325,410 B1* | 6/2019 | Smith | G06T 11/00 |
| 10,713,794 B1* | 7/2020 | He | G06N 3/084 |
| 11,152,032 B2* | 10/2021 | Ding | G11B 27/326 |
| 2001/0051950 A1* | 12/2001 | Basso | H04N 19/20 375/E7.076 |
| 2007/0200953 A1* | 8/2007 | Liu | H04N 21/4728 348/561 |

(Continued)

FOREIGN PATENT DOCUMENTS

| | | | | |
|---|---|---|---|---|
| WO | WO-2017/180439 A1 | 10/2017 | | |
| WO | WO-2017203432 A1 * | 11/2017 | ......... | G06F 16/7867 |

(Continued)

OTHER PUBLICATIONS

WO 2021070214 English Translation (Year: 2021).*
European Search Report on EP appln 22184401.2 dated Nov. 11, 2022.

*Primary Examiner* — Fernando Alcon
(74) *Attorney, Agent, or Firm* — Foley & Lardner LLP

(57) ABSTRACT

Systems, methods and apparatus for processing video can include a processor. The processor can be configured to perform object detection to detect visual indications of potential objects of interest in a video scene, to receive a selection of an object of interest from the potential objects of interest, and to provide enhanced video content within the video scene for the object of interest indicated by the selection.

21 Claims, 13 Drawing Sheets

(56) References Cited

U.S. PATENT DOCUMENTS

| | | | | |
|---|---|---|---|---|
| 2009/0009424 | A1* | 1/2009 | Kang | H04N 5/45 345/1.3 |
| 2009/0162033 | A1* | 6/2009 | Del Sordo | H04N 21/6543 386/326 |
| 2009/0167839 | A1* | 7/2009 | Ottmar | H04N 21/4314 348/14.08 |
| 2009/0228922 | A1* | 9/2009 | Haj-khalil | G06F 3/04845 725/38 |
| 2010/0026721 | A1* | 2/2010 | Park | G09G 5/14 345/660 |
| 2010/0218228 | A1* | 8/2010 | Walter | G06F 16/5854 725/105 |
| 2011/0067062 | A1* | 3/2011 | Karaoguz | H04N 5/76 725/40 |
| 2011/0299832 | A1 | 12/2011 | Butcher | |
| 2012/0216121 | A1* | 8/2012 | Lin | H04N 21/234327 709/219 |
| 2012/0304208 | A1* | 11/2012 | McWilliams | H04N 21/44016 725/14 |
| 2014/0023341 | A1* | 1/2014 | Wang | H04N 9/87 386/240 |
| 2015/0145944 | A1* | 5/2015 | Stonefield | H04W 4/18 348/14.02 |
| 2015/0156469 | A1* | 6/2015 | Qu | G09G 5/36 348/43 |
| 2015/0172775 | A1* | 6/2015 | Yee | H04N 21/6587 725/37 |
| 2015/0268822 | A1* | 9/2015 | Waggoner | H04N 21/4728 715/722 |
| 2015/0347829 | A1* | 12/2015 | Carbonell | G06Q 10/00 382/103 |
| 2016/0100092 | A1* | 4/2016 | Bohac | H04N 7/188 382/103 |
| 2016/0323554 | A1* | 11/2016 | Oh | H04N 5/57 |
| 2017/0154212 | A1* | 6/2017 | Feris | G06T 7/13 |
| 2017/0163929 | A1* | 6/2017 | Maliuk | H04N 5/775 |
| 2017/0302719 | A1 | 10/2017 | Chen et al. | |
| 2018/0060669 | A1* | 3/2018 | Pham | G06T 7/80 |
| 2018/0137647 | A1* | 5/2018 | Li | G06T 7/73 |
| 2018/0157915 | A1* | 6/2018 | Sherry | G06V 20/52 |
| 2018/0270445 | A1* | 9/2018 | Khandelwal | H04N 5/247 |
| 2019/0110087 | A1* | 4/2019 | Parasseeri | G06T 19/003 |
| 2019/0141568 | A1* | 5/2019 | Balakrishnan | H04W 4/08 |
| 2019/0286912 | A1* | 9/2019 | Chan | H04N 21/4316 |
| 2019/0294631 | A1* | 9/2019 | Alcantara | G06F 16/743 |
| 2019/0385376 | A1 | 12/2019 | Kim et al. | |
| 2020/0134837 | A1* | 4/2020 | Varadarajan | G06V 10/771 |
| 2020/0193163 | A1* | 6/2020 | Chang | H04N 21/4662 |
| 2020/0219316 | A1* | 7/2020 | Baik | G06T 7/70 |
| 2020/0258273 | A1* | 8/2020 | Chakrabarty | G06V 40/169 |
| 2020/0402541 | A1* | 12/2020 | Talbot | G06V 10/82 |
| 2021/0014571 | A1* | 1/2021 | Landow | H04N 21/812 |
| 2021/0274250 | A1* | 9/2021 | Chundi | H04N 21/44218 |

FOREIGN PATENT DOCUMENTS

| | | | | |
|---|---|---|---|---|
| WO | WO-2018015806 A1 | * | 1/2018 | G06K 9/00 |
| WO | WO-2018049321 A1 | * | 3/2018 | H04L 65/4092 |
| WO | WO-2018073765 A1 | * | 4/2018 | G06F 16/7867 |
| WO | WO-2018/152437 A1 | | 8/2018 | |
| WO | WO-2018152437 A1 | * | 8/2018 | G06F 3/04842 |
| WO | WO-2018208365 A1 | * | 11/2018 | G06K 9/00771 |
| WO | WO-2019046095 A1 | * | 3/2019 | H04N 21/4312 |
| WO | WO-2021070214 A1 | * | 4/2021 | |

* cited by examiner

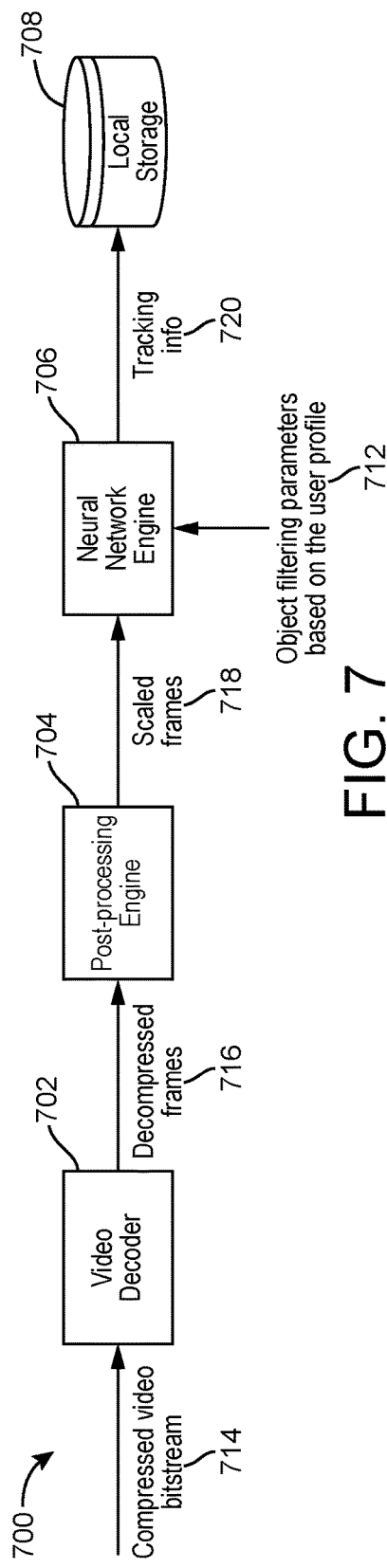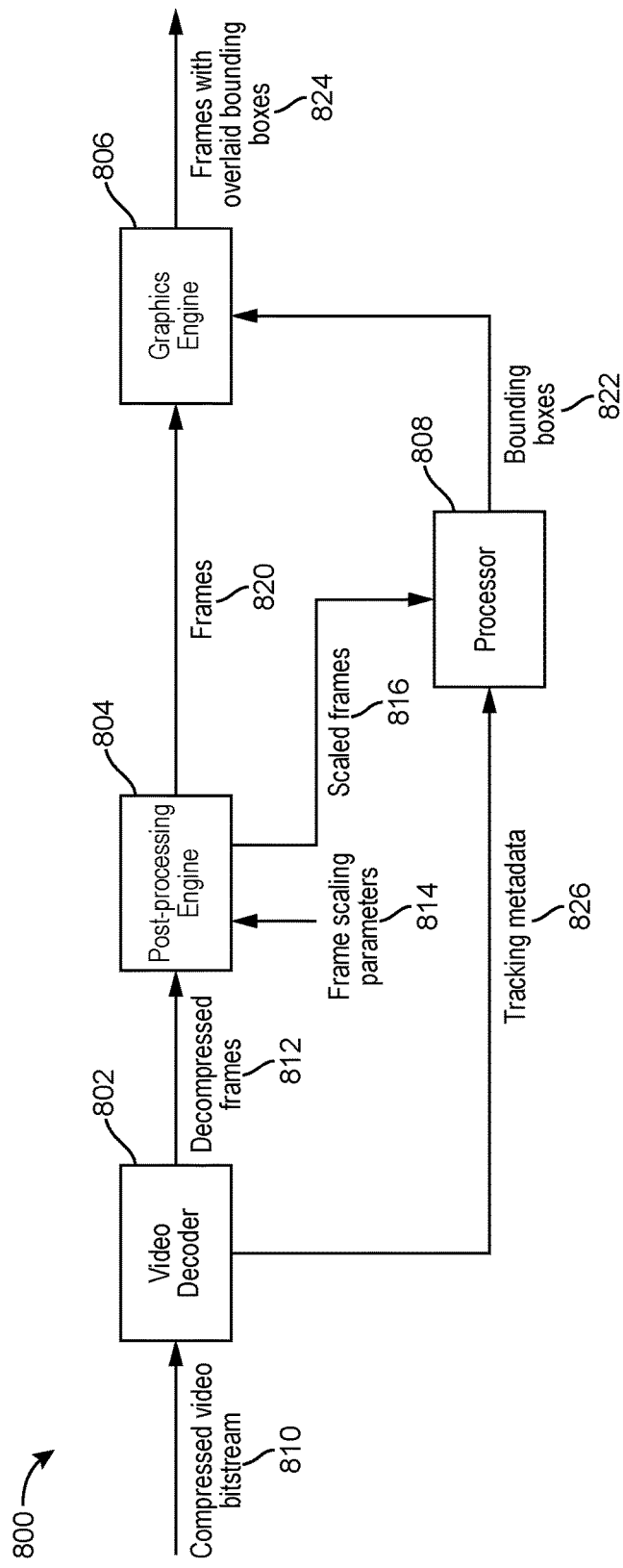

OBJECT OR REGION OF INTEREST VIDEO PROCESSING SYSTEM AND METHOD

BACKGROUND

The present disclosure relates to video processing including but not limited to video processing with machine learning. In digital video systems including but not limited to set top boxes, tuners, and/or video processors, a user can perform functions, for example slow motion, fast forward, pause, and rewind with detected and tracked video objects, that generally mimic the visual feedback given during slow motion, fast forward and rewind operations provided by digital video recorders (DVR). Further operations and information may enhance a user's video experience.

BRIEF DESCRIPTION OF THE DRAWINGS

Various video objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a block diagram of an exemplary video processing system for the system illustrated in FIG., according to some embodiments.

FIG. 8 is a block diagram of an exemplary video processing system for the system illustrated in FIG. 1, according to some embodiments.

Figure 1:
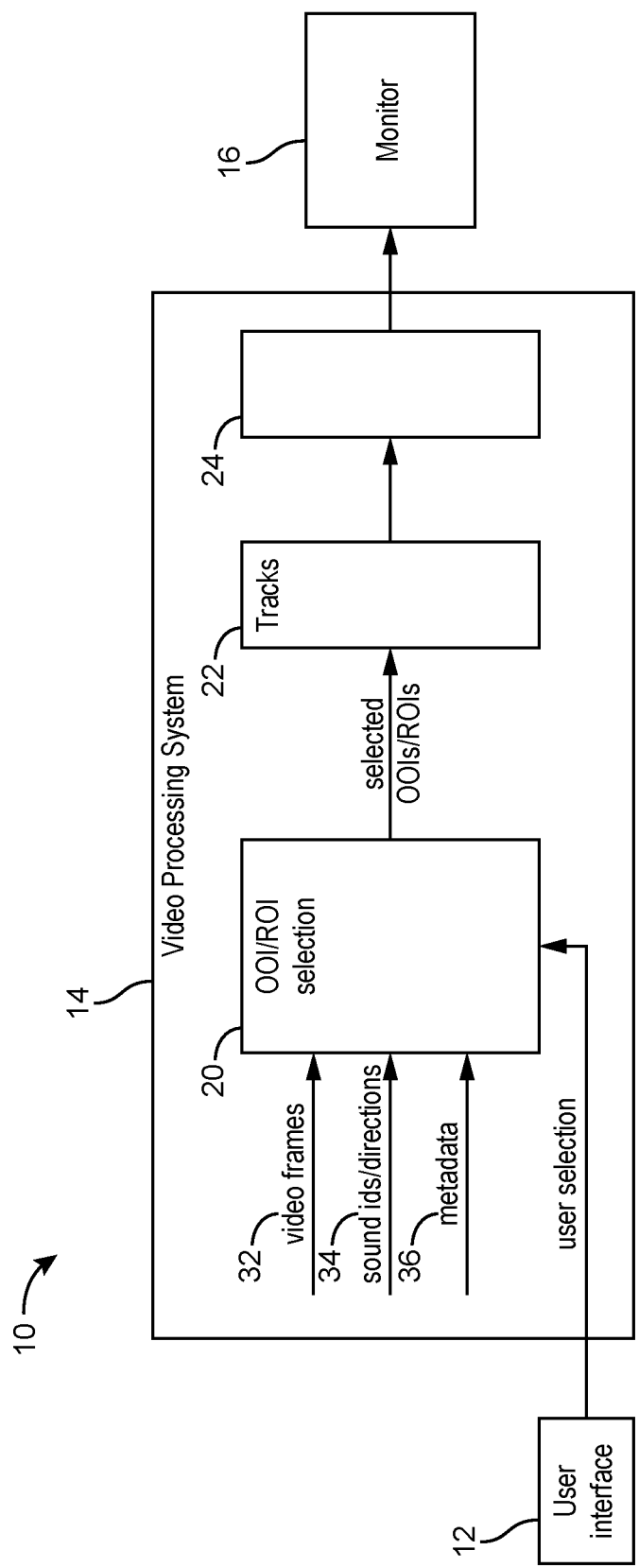
FIG. 1 is a general block diagram depicting an exemplary system capable of providing enhanced video content, according to some embodiments.

The details of various embodiments of the methods and systems are set forth in the accompanying drawings and the description below.

DETAILED DESCRIPTION

Following below are more detailed descriptions of various concepts related to, and implementations of, methods, apparatuses, and systems for video operations. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

The present disclosure is directed generally to systems and methods of providing object of interest (OOI) or a region of interest (ROI) video features which may enhance a user video experience. The term object of interest is intended to refer to an object, person, animal, region or any video feature of interest as used herein. In some embodiments, the video processing system allows users to automatically zoom in on a visual object or a region of the video scene for his or her interest. For example, for a sport video, a user can view in an athlete of interest in more detail or with more information; for a movie or TV show, a user can highlight his or her favorite actor; for a travel channel, a user can zoom into a specific scene region; for a shopping channel, a user can enlarge a special item etc.; for a training video, the user can enlarge a part or piece of equipment.

The video processing system advantageously overcomes problems associated with objects or regions of interest in live video moving quickly from frame to frame in some embodiments. These problems can be especially difficult if the live video is played on a low-cost home media player or a set-top box (STB) unit. Further, the video processing system advantageously overcomes problems associated with selecting objects or regions of interest by a remote control (with or without voice control capability) of a low-cost home media player or a set-top box unit in some embodiments. In some embodiments, the video processing systems accurately tracks potential objects or regions of interest and provides indications so they can be more easily selected.

In some embodiments, the video system and method has an object or region of interest video play architecture that provides a processing flow to address object and region of interest selection, detection and tracking. In some embodiments, deep learning object detection and tracking technologies are provided in a system-on-chip (SoC) or system on a multichip module. In some embodiments, potential objects or regions of interest are identified and displayed on a screen using object detection or metadata. The selection of objects or regions of interest may be controlled via appropriate user interfaces such as a remote control or a microphone (i.e.

voice interface) on the player or set top box unit. Object tracking is used to automatically adjust and indicate the objects or regions of interest in the subsequent frames during video play in some embodiments.

Some embodiments relate to systems, methods and apparatus for processing video that include a processor. The processor is configured to perform object detection to detect visual indications of potential objects of interest in a video scene, to receive a selection of an object of interest from the potential objects of interest, and to provide enhanced video content within the video scene for the object of interest indicated by the selection.

Some embodiments relate to an entertainment system for providing a video for viewing by a user. The entertainment system includes an interface configured to receive a selection, and one or more processors, one or more circuits, or any combination thereof. The one or more processors, one or more circuits, or any combination thereof is configured to provide visual indications of potential objects of interest in a video scene, receive the selection of an object of interest from the potential objects of interest, and provide enhanced video content within the video scene for the object of interest indicated by the selection.

Some embodiments relate to a method. The method includes providing a first video stream for display, and receiving a user selection of an object of interest. The method also includes providing a second video stream directed to the same video content as the first video stream, wherein the second video stream comprises enhanced video content for the object of interest indicated by the user selection.

FIG. 1 is a block diagram depicting an example of an entertainment system 10. The entertainment system 10 is any system for providing video (including but not limited to educational systems, training systems, design systems, simulators, gaming systems, home theaters, televisions, augmented realty systems, remote auction systems, virtual reality systems, live video meeting systems, etc.) The entertainment system 10 includes a user interface 12, a video processing system 14, and a monitor 16 in some embodiments. The entertainment system 10 provides object of interest processing for video playback in some embodiments. The entertainment system 10 uses the video processing system 14 to process user inputs to provide enhanced video content for user selected objects of interest in some embodiments. The video including the enhanced video content is provided on the monitor 16 for viewing by the user.

The video processing system 14 receives video frames 32 associated with a video stream from a source. The source is any source of video including but not limited to media players, cable providers, internet subscription services, a headend, a video camera, stored media servers, satellite providers, set top boxes, video recorders, computers, or other source of video material. The video processing system 14 includes a selector 20, a tracker 22, and a video enhancer 24.

The selector 20 identifies or detects potential objects of interest in the video frames 32 received at an input and receives a user selection from the user interface 12. The selector 20 identifies potential objects or regions of interest using metadata 36 at an input, sound information 34 at an input, and/or video processing of the video frames 32. Various video and data processing techniques can be used to detect objects of interest and potential objects of interest in some embodiments. In some embodiments, the selector 20 and tracker 22 uses a deep learning object detection system-on-chip (SoC). The potential objects or regions of interest are identified using video object detection or metadata in some embodiments.

The tracker 22 tracks the selected object of interest and potential objects of interest in the video frames 32 and provides data to the video enhancer 24 so the video enhancer 24 can provide enhanced video for the selected object of interest. The enhanced video is provided as video frames in a stream to the monitor 16. The tracker 22 uses frame history and movement vectors to track the object of interest and potential objects of interest in some embodiments. The tracker 2 uses metadata 36, sound information 34 (e.g., sound cues), and/or video processing of video frames 32 to track objects of interest and potential objects of interest in some embodiments. Tracker 22 automatically tracks the selected object or region of interest in subsequent frames during video play.

The video enhancer 24 uses the tracked potential and selected objects or regions of interest from the tracker 22 and provides enhanced video or indications in subsequent frames. In some embodiments, video enhancer 24 automatically provides a zoomed image for the object of interest or a local region of the scene selected by the user. The level of zoom can be controlled through the user interface 12. In some embodiments, video enhancer 24 automatically provides a highlighted image, a recolored image, a high contrast image, a higher definition image, or a three dimensional image as a video enhancement for the object of interest or a local region of the scene selected by the user. In some embodiments, the enhanced video includes textual information, graphics, icons, or symbology that provide additional information regarding the object of interest in video format. The video enhancer 24 also provides indications for potential objects of interest so the user can select those objects of interest in some embodiments. The indications and the enhanced video is provided in a video signal provided to monitor 16. The video signal can be a stream or series of video frames.

User interface 12 can be a smart phone, a remote control, a microphone, a touch screen, tablet, mouse, or any device for receiving user inputs such as selections of objects pf interest which can include regions of interest and types of video enhancements. User interface 12 receives a command from the user interface 12 to start an object of interest or region of interest selection process on a set top box unit or recorder in some embodiments. The user interface 12 can include a far field voice interface or push to talk interface, game controllers, buttons, touch screen, or other selectors. The user interface 12 is part of a set top box unit, computer, a television, a smart phone, a fire stick, home control unit, a gaming system, augmented realty system, virtual reality system, a computer, or other video system in some embodiments.

The monitor 16 can be any type of screen or viewing medium for video signals from the video processing system 14. The monitor 16 is a liquid crystal display (LCD), plasma display, television, computer monitor, smart television, a glasses display, a head worn display, a projector, ahead up display, or any other device for presenting images to a user. The monitor 16 is part of or connected to a simulator, a home theater, a set top box unit, a computer, a smart phone, a smart television, a fire stick, a home control unit, a gaming system, an augmented realty system, virtual reality system or other video system in some embodiments.

The video stream processed by video processing system 14 can be in the form of video frames provided from a media server or client device. Examples of the media server include a set-top box (STB) that can perform digital video recorder functions, a home or enterprise gateway, a server, a computer, work station, etc. Examples of a client device include a television, a computer monitor, mobile computer, a projector, tablet, or a hand-held user device (e.g., smart phone), etc. The media server or client device is configured to output audio, video, program information, and other data to the video processing system 14 in some embodiments. The entertainment system 10 has components interconnected by wired connections or a wireless connection (e.g., a wireless network). For example, connections can include coaxial cable, BNC cable, fiber optic cable, composite cable, s-video, DVI, HDMI, component, VGA, DisplayPort, or other audio and video transfer technologies. Wireless network connections can be a wireless local area network (WLAN) and can use Wi-Fi in any of its various standards. In some embodiments, video processing system 14 is implemented as a single chip or a system on chip (SOC). In some embodiments, the detection of objects of interest and provision of indicators and enhanced video is provided in real time.

In some implementations, the video processing system 14 includes one or more decoding units, display engines, a transcoders, processors, and a storage units (e.g., frame buffers, memory, etc.). The video processing system 14 includes one or more microprocessors, digital signal processors CPUs, application specific integrated circuits (ASICs), programmable logic devices, servers and/or one or more other integrated circuits. The video processing system 14 can include one or more processors that can execute instructions stored in memory for performing the functions described herein. The storage units include, but are not limited to disk drives, servers, dynamic random access memories (DRAMs), flash memories, memory registers or other types of volatile or non-volatile fast memory. The video processing system 14 can include other components not shown in FIG. 1. For example, the video processing system 14 can include additional buffers (e.g., input buffers for storing compressed video frames before they are decoded by the decoders), network interfaces, controllers, memory, input and output devices, conditional access components, and other components for audio/video/data processing.

The video processing system 14 can provide video streams in a number of formats (e.g., different resolutions (e.g., 1080p, 4K or 8K), frame rates (e.g., 60 fps vs. 30 fps), bit precisions (e.g., 10 bits vs. 8 bits), or other video characteristics. For example, the received video stream or provided video stream associated with the video processing system 14 includes a 4K Ultra High Definition (UHD) (e.g., 3,840×2,160 pixels or 2160p) or even 8K UHD (7680× 4320) video stream in some embodiments.

Figure 2:
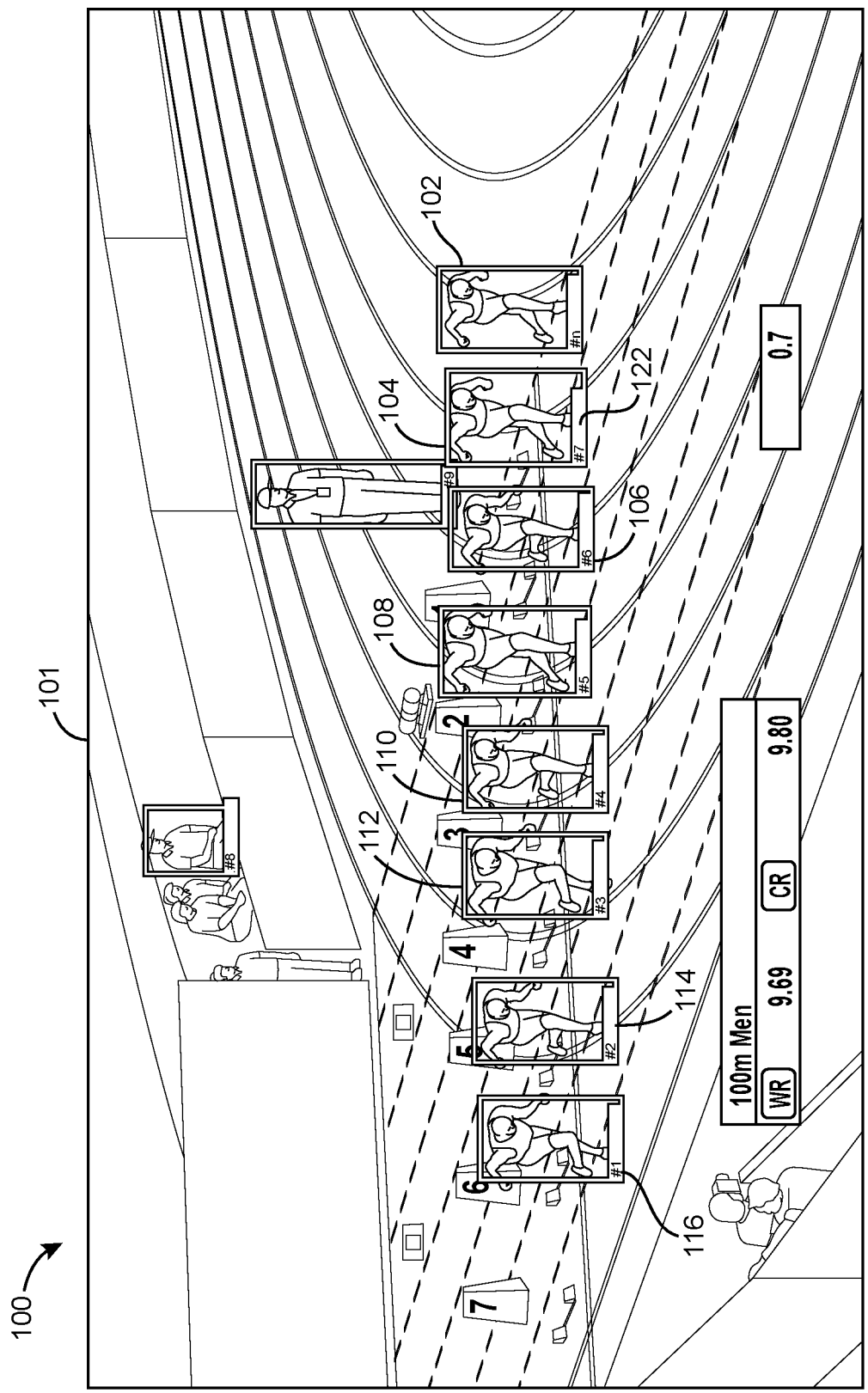
FIG. 2 is a drawing depicting a video scene with indications of potential objects of interest, according to some embodiments.

With reference to FIG. 2, the video processing system 14 provides a video scene 100 on monitor 16. Although video scene 100 is shown as a track meet, the video scene 100 can be any type of video scene including any sporting event, movie, television show, auction, simulation, training video, educational video, etc. In some embodiments, video processing system 14 provides boxes 102, 104, 106, 108, 110, and 112 around each athlete as indications of potential objects of interest.

The boxes 102, 104, 106, 108, 110, and 112 are bounding boxes and include labels or numbers for enabling user selections in some embodiments. FIG. 2 shows a video frame 101 of the video scene 100. Boxes 102, 104, 106, 108, 110, and 112 can also be provided around spectators, coaches, and referees or other officials. Although the indicators are shown as boxes 102, 104, 106, 108, 110, and 112, other indicators or symbology can be utilized (e.g., arrows, labels, icons, highlighting, etc.).

Textual information can also be provided with the boxes 102, 104, 106, 108, 110, and 112 including the athlete's identification, time, lane number, name, current place, game stats for the athlete, speed, betting odds, etc. (e.g., text information 122). The text information could include price, current bid, or other information about a product in a home shopping application in some embodiments. The text information can be provided with the zoomed image of the athlete or be provided in a portion of the screen not associated with the action (e.g., bottom left corner) in some embodiments. The text information can include a number form #1 to #n for identifying boxes 102, 104, 106, 108, 110, and 112 and selecting one or more of the boxes 102, 104, 106, 108, 110, and 112.

The user can select one or more of the potential objects of interest via the user interface 12 for enhanced video. In the example of FIG. 2, the athlete in box 108 is selected and is provided in a zoomed image as the enhanced image by the video enhancer 24. The zoomed image can appear in the video scene 100 at its tracked location or can be provided on another part of the video scene 100. Video blending techniques can be used to provide the enhanced video image within the video scene 100 to reduce sharp contrasts.

The user can adjust the size and position of the object of interest, e.g. zoom in, zoom out, shift left/right/up/downright, enlarge or reduce the image of the object of interest through the user interface 12. A region of interest may be selected using one object or multiple objects as a group.

Figure 3:
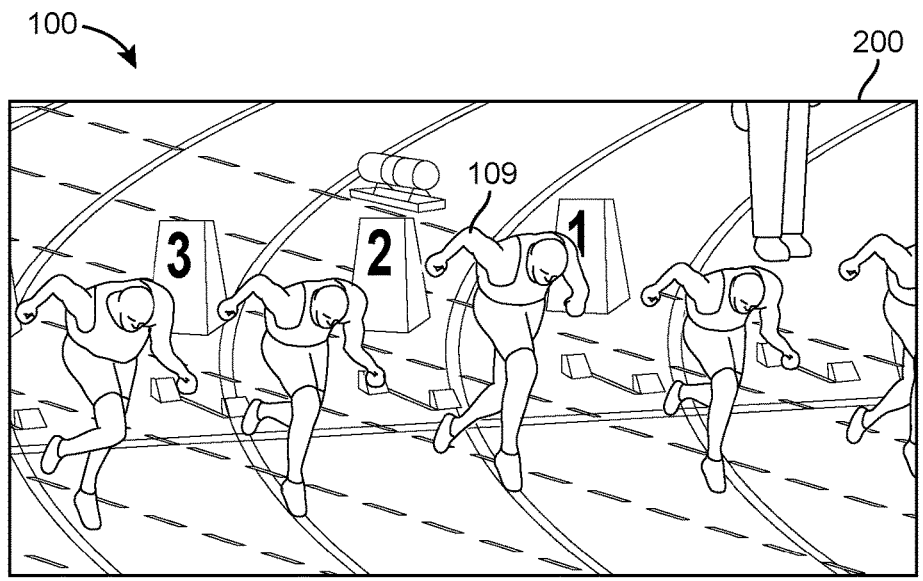
FIG. 3 is a drawing depicting the video scene of FIG. 2 with enhanced video content for an object of interest, according to some embodiments.

With reference to FIG. 3, the video processing system 14 provides a frame 200 in the video scene 100 on the monitor 16. The frame 200 is a future frame from the frame 101 of the video scene 100 and includes the athlete 109 in box 108 (FIG. 2) as a larger zoomed image as compared to other athletes in the scene 100. Textual information can provided with the boxes 102, 106, 104, 108, 110, and 112 including current place, and speed (e.g., text information 214 for box 106 (FIG. 2). The scene 100 is cropped in frame 200 to provide a proportionality for the zoomed image in some embodiments.

Figure 4:
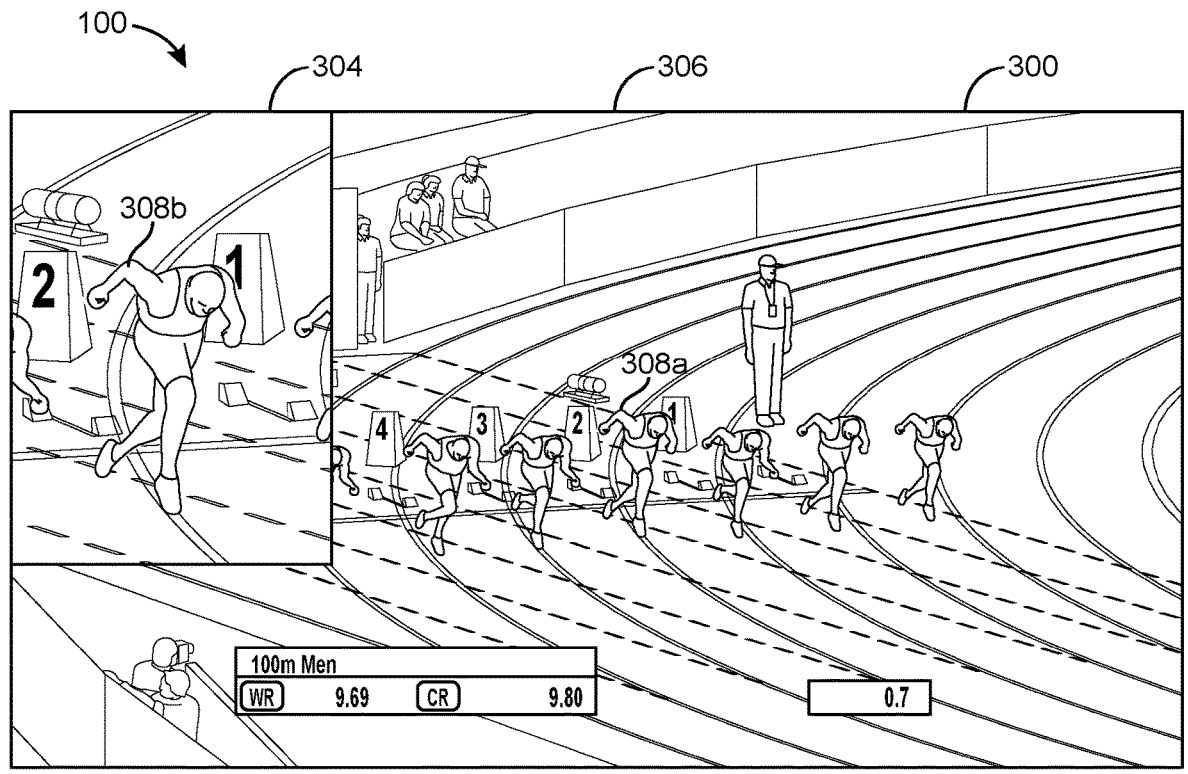
FIG. 4 is a drawing depicting the video scene of FIG. 2 with enhanced video content for an object of interest using a picture in picture mode, according to some embodiments.

With reference to FIG. 4, the video processing system 14 provides a frame 300 in the video scene 100 on the monitor 16. The frame 300 is a future frame from the frame 101 of the video scene 100 and includes the athlete 308a as a zoomed image 308b of the athlete 308a in a picture in picture region 304. Picture in picture region 304 can be placed at any area on the scene 100 and the size and zoom features can be adjusted by the user in some embodiments. Textual information can be provided in the scene 100 either in region 304 or outside region 304 in a region 306. The textual information can include statistics such as race time. A box can be provided around other objects of interest besides athletes in scene 100. Although only one zoomed image is shown in frames 101, 200 and 300, multiple objects of interests can be chosen for enhanced video features in some embodiments.

Figure 5:
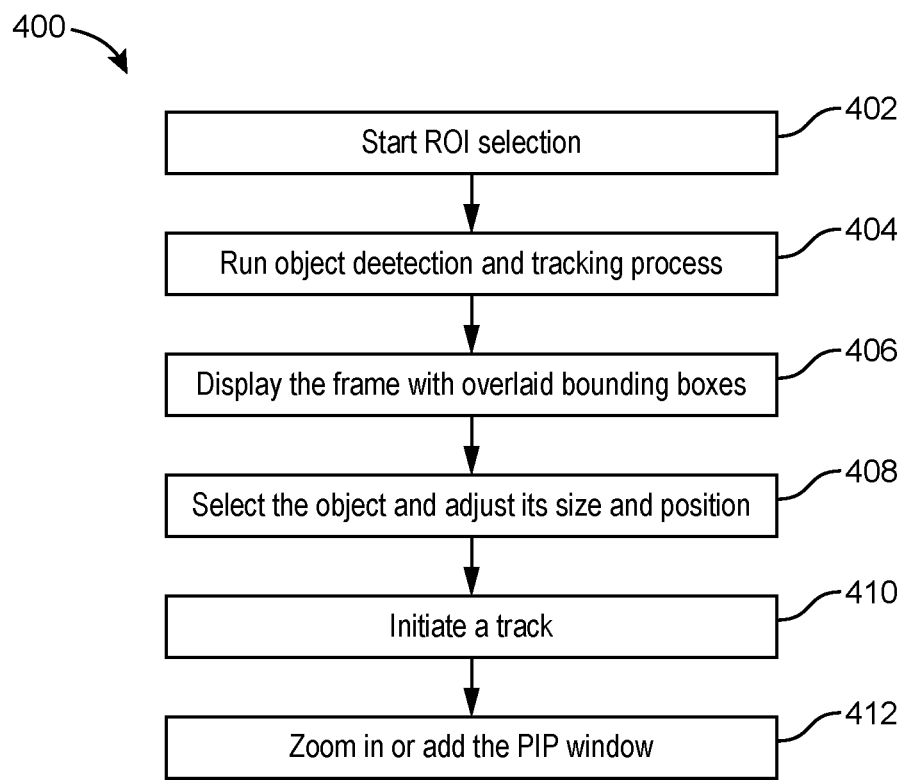
FIG. 5 is a flow diagram depicting operations used by the system illustrated in FIG. 1 to provide exemplary enhanced video, according to some embodiments.

With reference to FIG. 5, video processing system 14 (FIG. 1) performs a flow 400 to provide enhanced video. The flow 400 includes a start object of interest selection operation 402 followed by the execution of object detection and tracking processes by selector 20 (FIG. 1) and tracker 22 in an operation 404. In operation 402, a user selects on object of interest or region of interest video enhancement mode. In operation 404, the object detection and tracking processes can use deep learning and convolutional neural networks, metadata tags, speech processing, multi-modality signal processing, feature extractors, etc. to detect and track objects of interest or regions of interest.

At an operation 404, a frame is provide for display with overlaid bounding boxes for each potential object of interest detected and tracked by operation 404. At an operation 408, the selection of an object is received and video enhancements are provided by the video enhancer 24 for the selected object. The video enhancements include object size and positon adjustments in some embodiments. At an operation 410, a track with enhanced video for the selected object is initiated. At an operation 412, the selected object of interest is provided in a frame including zoomed features of the selected object of interest or a picture in picture window (e.g., region 304 in FIG. 3) including the selected object. Subsequent frames for the track include the video enhancement for the selected object of interest until the user exits the object or region of interest mode or until the object of interest leaves the video scene in some embodiments. In some embodiments, if the object of interest reenters the scene, a new track for the object of interest with enhanced video features is initiated in operation 410.

Figure 6:
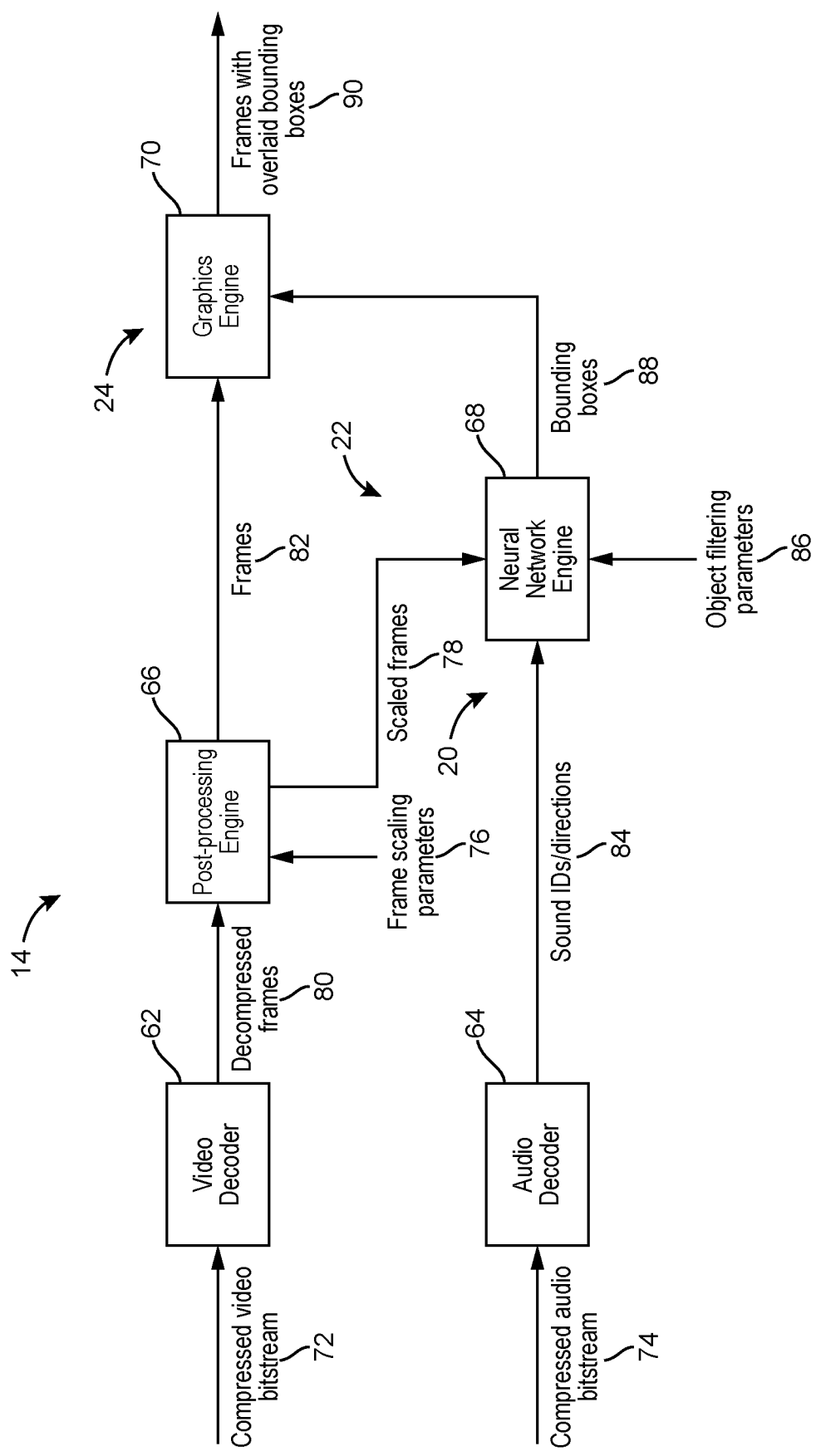
FIG. 6 is a block diagram of an exemplary video processing system for the system illustrated in FIG. 1, according to some embodiments, according to some embodiments.

With reference to FIG. 6, video processing system 14 includes a video decoder 62 receiving a compressed data stream 72, an audio decoder 64 receiving a compressed audio bit stream 74, a post-processing engine 66 receiving decompressed frames 80, a neural network engine 68 receiving sound and direction data 84 and scaled frames 78, and object filtering parameters 86, and a graphics engine 70 receiving bounding boxes 88 and frames 82. Selector 20, tracker 22 and video enhancer 24 cooperate to perform the video processing operations as described with reference to FIG. 6. The operations described with reference to FIG. 6 can be performed at a video player or set top box unit.

The compressed data stream 72 is comprised of video frames of a scene which are extracted at the start of a tracking process. Each video frame in the compressed data stream 72 is decoded by the video decoder 62 to provide decompressed frames 80. The size and pixel format of each decoded video frame of the decompressed frames 80 is adjusted to match the input size and pixel format of the object detector or selector 20 using the post-processing engine 66. Post-processing engine 66 performs operations including but not limited to scaling, cropping, color space conversion, bit depth conversion, etc. according to some embodiments.

The neural network engine 68 runs object detection on each scaled frame of the scaled frames 78 and outputs a list of detected objects with bounding boxes 88. The object list can be filtered by pre-defined object sizes, object types etc. as well as sound identifications and directions generated from the audio decoder 64 from the compressed audio bit stream 74. The processing is background processing in parallel with normal video processing and display, or is processing performed while the display of video is paused. The filtered bounding boxes 88 are overlaid on top of the decoded frame 82 to provide the frames with detected bounding boxes 90 in the enhancer 24. Video associated with the frames with detected bounding boxes 90 is displayed on monitor 16 (FIG. 1) for the user to select which object or region to track via user interface 12.

In some embodiments, the compressed data stream 72 (e.g., a video bit stream) is a high-dynamic range (HDR) video bit stream, and the video decoder 62 parses the HDR parameters from the compressed data stream 72 which are provided to the graphics engine 70. The overlaid graphics including the bounding boxes 88 are adjusted according to the HDR parameters.

With reference to FIG. 7, video processing system 14 includes a video decoder 702 receiving a compressed data stream 714, a post processing engine 704 receiving decompressed frames 716, a neural network engine 706 receiving object filtering parameters based on a user profile 712 and scaled frames 718, and a local storage 708 receiving tracking information 720. Selector 20, tracker 22 and video enhancer 24 (FIG. 1) cooperate to perform the video processing operations as described with reference to FIG. 7. The tracking information is pre-generated and is computed or saved as a metadata file on a local device (e.g., local storage 708) during a recording process in some embodiments. The tracking information is downloaded or streamed (with video) as a metadata stream from a cloud source in some embodiments.

Figures 9, 10A:
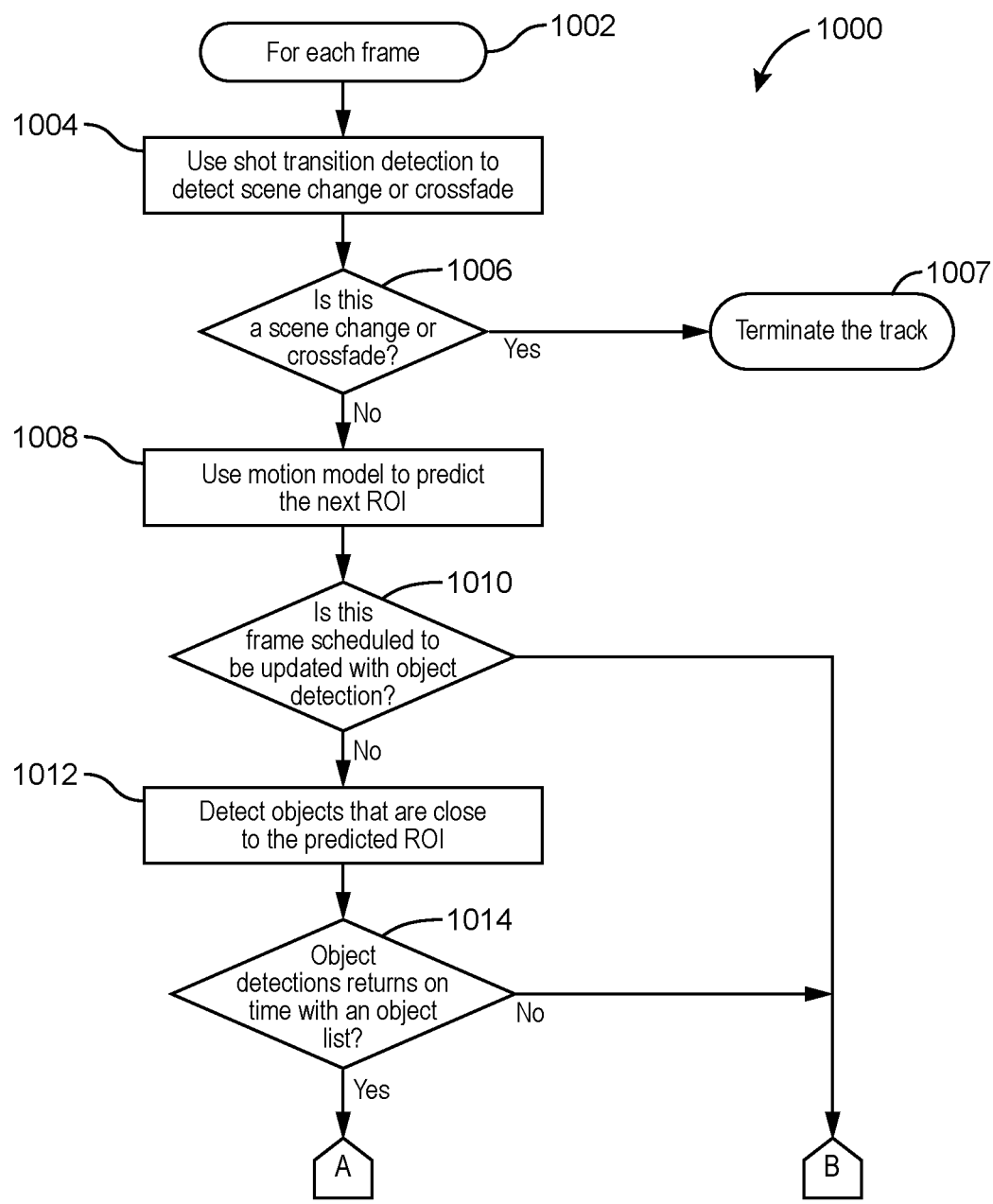
FIG. 9 is a drawing depicting an exemplary electronic program guide display, according to some embodiments.
FIGS. 10A-B depict a flow diagram including tracking operations used by the system illustrated in FIG. 1 to provide exemplary enhanced video, according to some embodiments.

With reference to FIG. 8, video processing system 14 includes a video decoder 802 receiving a compressed data stream 810, a post processing engine 804 receiving decompressed frames 812 and frame scaling parameters 814, a graphics engine 806 receiving bounding boxes 822 and frames 820, and a processor 808 receiving tracking metadata 826 and scaled frames 816. Selector 20, tracker 22 and video enhancer 24 (FIG. 1) cooperate to perform the video processing operations as described with reference to FIG. 8. The user can select which track to follow based on a metadata file. The tracking information in metadata file (e.g., tracking metadata 826) includes information for all tracks of interest, e.g. some specific object types, which can be derived from the user profile, either explicitly or implicitly according to the previous user selection history. The tracking information metadata file has the following fields for each track of interest, including but not limited to a frame number, a timestamp, a track identification, an object identification, and bounding box coordinates. With reference to FIG. 9, the tracking information can be blended into the electronic program guide (EPG) display 900 to show whether this program has tracking information and if yes, what types of the tracking information are available.

Figure 10B:
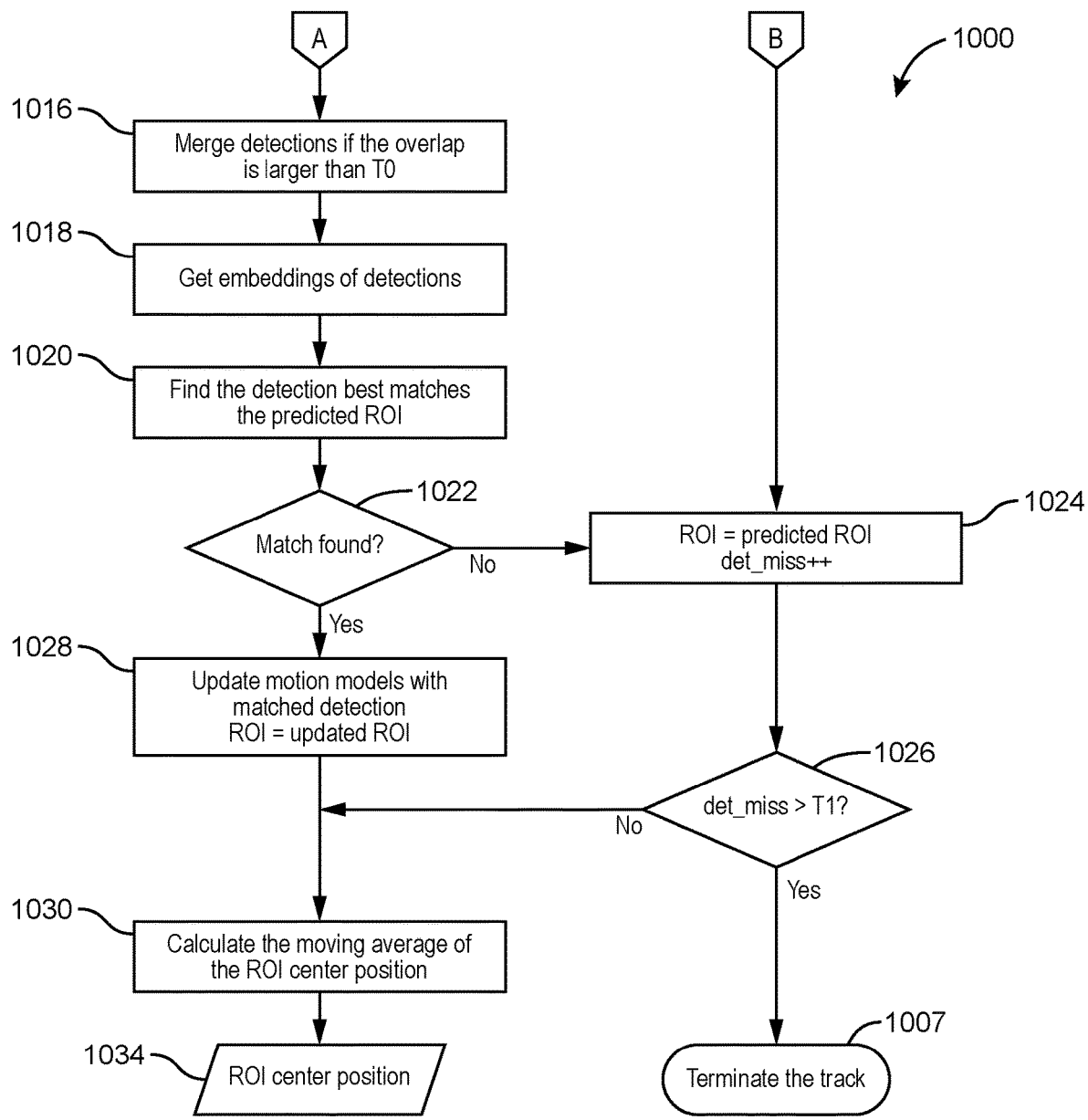

With reference to FIGS. 10A-B, the video processing system 14 (FIG. 1) performs a flow 1000 for each frame 1002 to provide enhanced video for a track. In some embodiments, flow 1000 performs a tracking process including three components: motion modeling, appearance modelling and object detection. A motion model is used to predict the object motion trajectory in some embodiments.

The video processing system 14 performs shot transition detection to detect a scene change or cross fade at an operation 1004. If the frame includes or is part of a scene change or cross fade, the track is terminated at an operation 1007. In an operation 1006, if the frame 1002 does not include or is not part of a scene change or cross fade, the video processing system 14 proceeds to an operation 1008. At operation 1008, a motion model is used to predict the location of the object of interest in the next frame, the next region of interest or region associated with the object of interest in some embodiments.

At an operation 1010, the video processing system 14 determines if the frame 1002 is scheduled to be updated with object detection. If the frame is scheduled to be updated with object detection, flow 1000 advances to operation 1024. At operation 1024, the predicted object of interest or region of interest is used and the detection miss counter is incremented by one. If the frame is not scheduled to be updated with object detection, flow 1000 advances to an operation 1012 and video processing system 14 detects objects that are close to the predicted object or region of interest. Due to the throughput limitation of selector 20 (FIG. 1) (e.g., a detector of a set top box unit), if the current frame is not scheduled to be updated by object detection, the predicted object of interest or region of interest is directly output as the object of interest or region of interest of the current frame in the operation 1012. Otherwise, object detection is run on the current frame to find objects that are close to the predicted region of interest.

At an operation 1014, the video processing system 14 determines if object detection processing has returned on time with an object list. If object detection processing has returned on time with an object list, flow 1000 advances to operation 1016. If object detection processing has not returned on time with an object list, flow 1000 advances to the operation 1024. To speed up the detection, object detection can be run only on a portion of the current frame that surrounds the predicted object of interest or region of interest. If no object is found on time in operation 1014, predicted object of interest or region of interest is used and a detection miss counter is incremented by one in the operation 1024.

At an operation 1016, the video processing system 14 merges detections if the overlap is larger than TO, where TO is a threshold. The detected object list is checked and detections with significant overlaps are merged in operation 1016 in some embodiments.

At an operation 1018, the video processing system 14 obtains embeddings of detections. At an operation 1022, the video processing system 14 determines if the detection best matches the predicted region of interest using the embeddings. If the detection best matches the predicted region of interest, flow 1000 advances to operation 1028. Similarity scores between the detections and target are computed using the embedding vectors of operation 1018 in some embodiments. The detection that best matches the predicted object of interest or region of interest using both the bounding boxes overlap and similarity scores is selected as the match. If a match is found, the matched detection is used to update the motion model and the updated object of interest or region of interest is output.

In the operation 1022, if the detection does not best match the predicted region of interest, flow 1000 advances to an operation 1024. At the operation 1024, the predicted object of interest or region of interest is used and the detection miss counter is incremented by one.

After operation 1024, the video processing system 14 determines if the miss counter is greater than T1 where T1 is a threshold. If the miss counter is not greater than T1, flow 1000 advances to operation 1030. If the miss counter is greater than T1, flow 1000 advances to operation 1007 and the track is terminated. Therefore, the tracking process is terminated if the detection miss counter is larger than a given threshold T1 in operation 1024.

At an operation 1028, the video processing system 14 updates motion models with matched detection region of interest. At an operation 1030, the video processing system 14 calculates the moving average of the region of interest center position 1034. The moving average of the object of interest or region of interest center position is calculated to smooth the tracking object trajectory in some embodiments.

Figure 11:
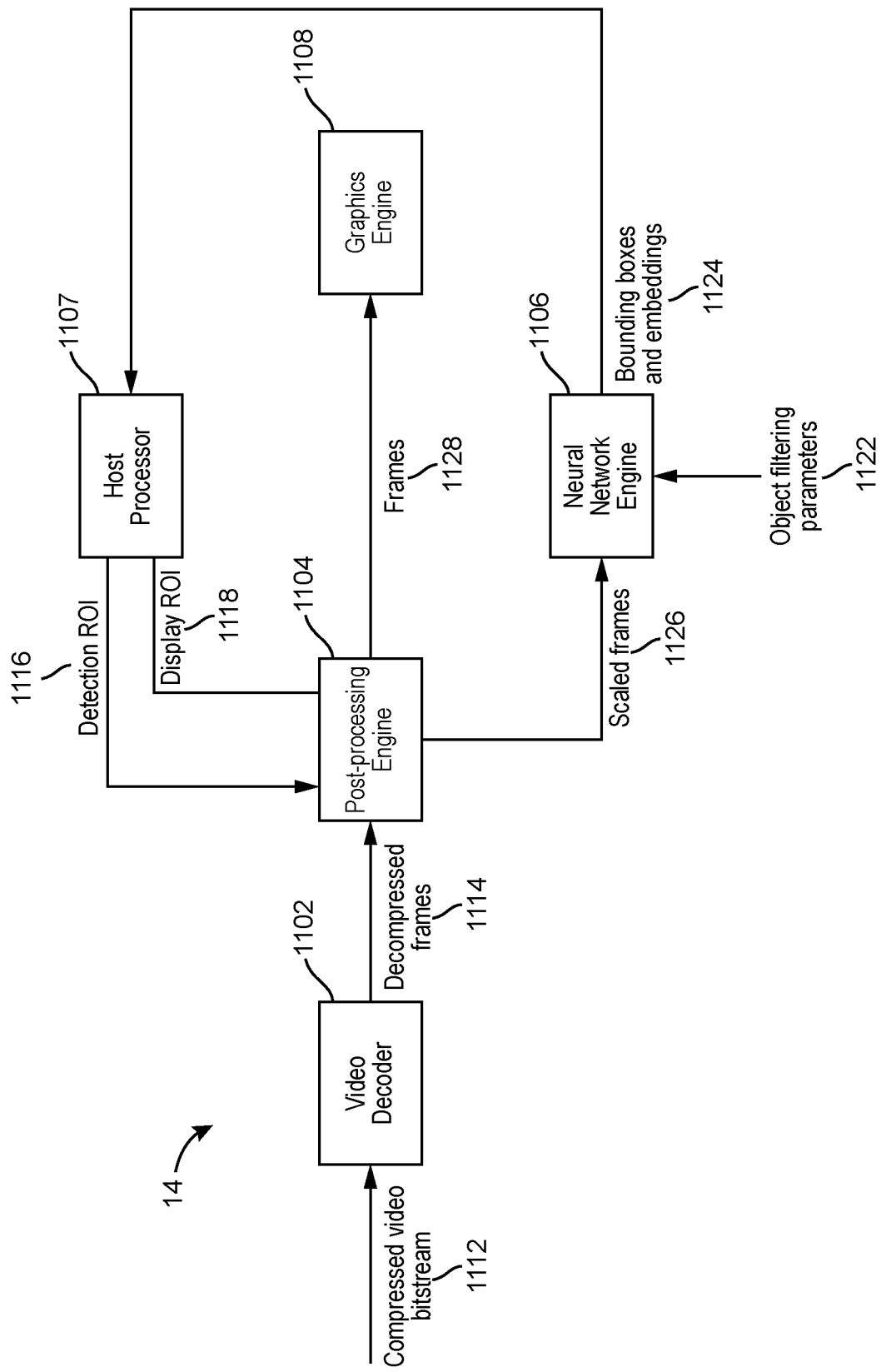
FIG. 11 is a block diagram depicting an exemplary set top box system configured for detection and tracking operations, according to some embodiments.

With reference to FIG. 11, the video processing system 14 includes a video decoder 1102 receiving a compressed data stream 1112, a post-processing engine 1104 receiving decompressed frames 1114, detections regions of interest 1116, and display objects of interest or regions of interest 1118, a host processor 1107 receiving bounding boxes and embeddings 1124, a graphics engine 1108 receiving frames 1128, and a neural network engine 1106 receiving object filtering parameters 1122 and scaled frames 1126. Selector 20, tracker 22 and video enhancer 24 (FIG. 1) cooperate to perform the video processing operations as described with reference to FIG. 11. The video processing system 14 is provided at the player or set top box unit in some embodiments.

The host processor 1107 uses a motion model to generate a predicted object of interest or region of interest, and derives the detection region of interest 1116 based on predicted object of interest or region of interest. The host processor 1107 sends the result (e.g., the detection region of interest 1116) to the post-processing engine 1104. The post-processing engine 1104 uses the detection region of interest 1116 to generate a scaled frame (e.g., scaled frames 1126) surrounding the predicted object of interest or region of interest for the neural network engine 1106. The neural network engine 1106 executes the object detection processes and sends the resulting bounding boxes and embeddings 1124 to the host processor 1107 for target matching. The host processor 1107 uses the bounding boxes and embeddings 1124 to find the best match to the target. The display object of interest or region of interest 1118 is derived based on the matched result and zoom in ratio. The object of interest or region of interest 118 is sent to the post-processing engine 1104 to extract the pixels to be displayed. When a track terminates, the video processing system 14 can either pause at the last updated frame that contains the target or gracefully restore the original full size window in some embodiments.

Figure 12:
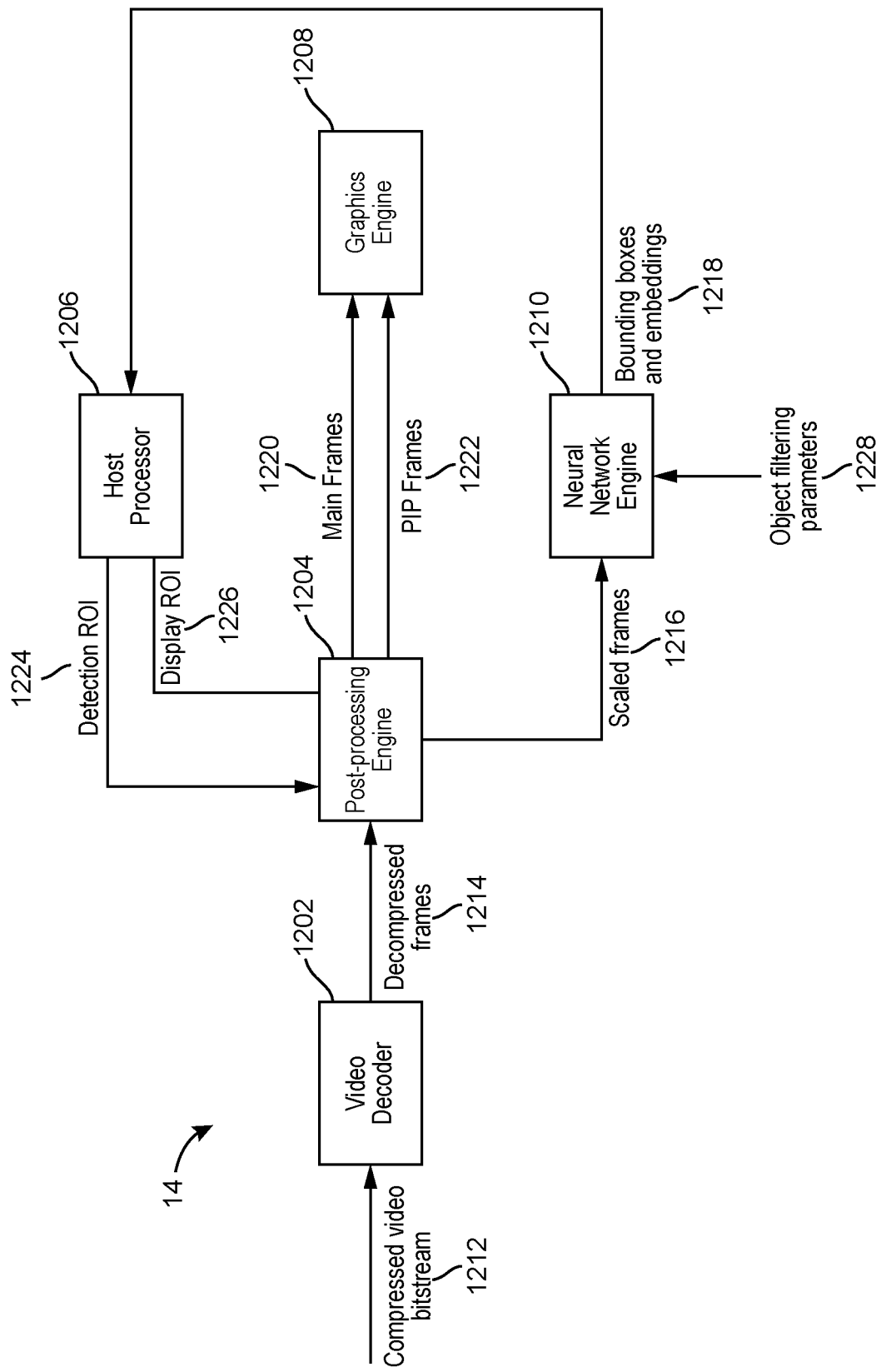
FIG. 12 is a block diagram depicting an exemplary set top box system configured for picture in picture operations, according to some embodiments.

With reference to FIG. 12, the video processing system 14 includes a video decoder 1202 receiving a compressed data stream 1212, a post processing engine 1204 receiving decompressed frames 1214, detections of objects or regions of interest 1224, and display regions of interest 1226, a host processor 1206 receiving bounding boxes and embeddings 1218, a graphics engine 1208 receiving main frames 1220 and picture in picture frames 1222, and a neural network engine 1210 receiving object filtering parameters 1222 and scaled frames 1126. Selector 20, tracker 22 and video enhancer 24 (FIG. 1) cooperate to perform the video processing operations as described with reference to FIG. 12. The video processing system 14 is provided at the player or set top box unit in some embodiments.

The video processing system 14 provides enhanced video in a picture in picture mode in some embodiments. After the host processor 1206 the display determines the objects or regions of interest 1226, the host processor 1206 sends the determined objects or regions of interest 1226 to the post processing engine 1204 to extract an image patch for the tracking object. By default, the target image patch is displayed as a picture in picture window (e.g., using the picture in picture frames 1222 and the main frame 1220 in some embodiments). The user can also swap the main window and picture in picture window (e.g., display the target image patch as the main window and original image as the picture in picture window). When the track terminates, the video processing system 14 can either can pause at the last updated frame that contains the target or the picture in picture window or gracefully fade out as the main window continues to play.

Figure 13:
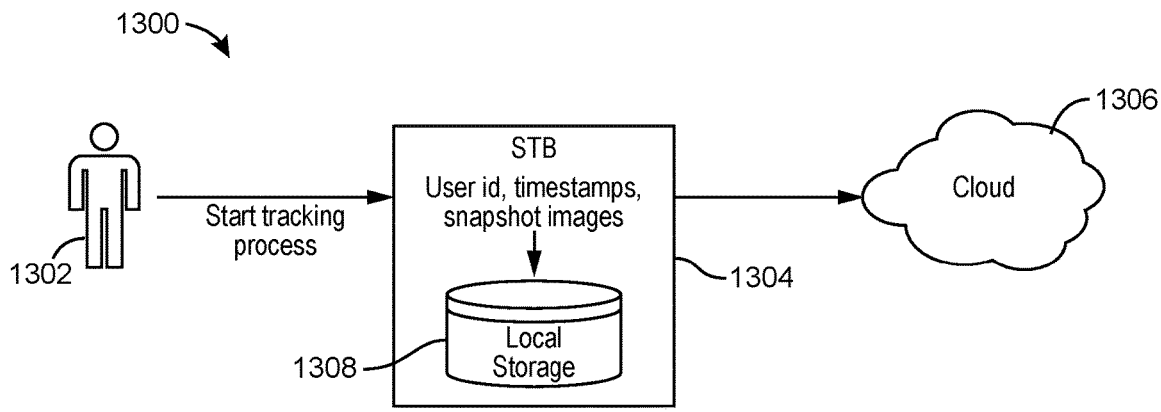
FIG. 13 is a block diagram depicting an exemplary set top box system configured for object of interest selection, according to some embodiments.

With reference to FIG. 13, a system 1300 includes a set top box device 1304 including local storage 1308 and is configured to collect and track user data and share tracking information. When a user 1302 starts the tracking process, the set top box device 1304 collects timestamped snapshot images of the tracking objects in some embodiments. The collected data together with an identification of the user 1302 is stored in local storage 1308 (e.g., a flash drive) or storage server in a cloud 1306 or other network. When sent to the cloud 1306, the user data may be encrypted, e.g. using a homomorphic encryption algorithm. The encrypted user data can be analyzed and classified without being decrypted in some embodiments.

Figure 14:
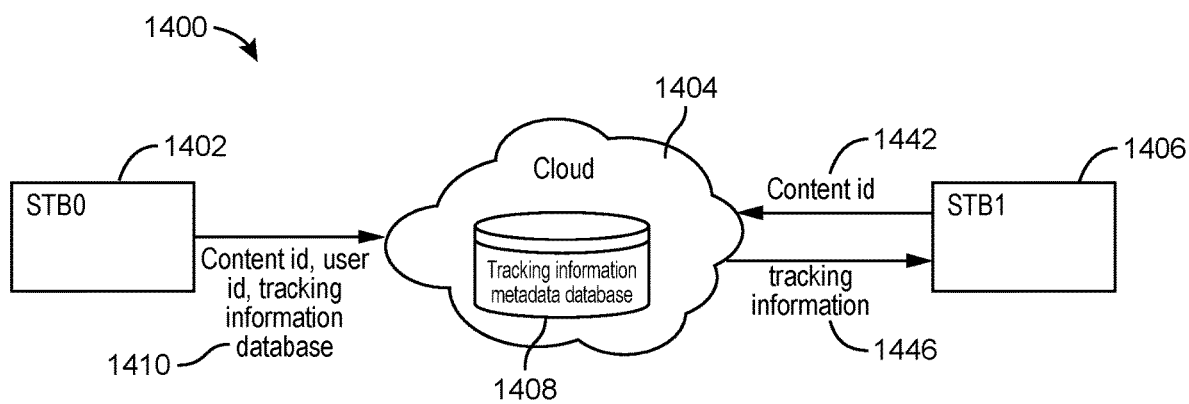
FIG. 14 is a block diagram depicting an exemplary set top box system configured for sharing metadata and tracking information, according to some embodiments.

With reference to FIG. 14, a system 1400 includes a set top box device 1402, a cloud database 1408 in a cloud 1404, and a set top box device 1406. Set top box device 1406 provides content identification 1442 to the cloud 1404 and receives tracking information 1446 from the cloud 1404. The set top box device 1402 provides content identification, user identification, and tracking information to the cloud 1404. System 1400 is configured to collect and track user data and metadata file information, upload the metadata file information to the cloud for sharing with other users.

The tracking information metadata file may be uploaded to the cloud 1404 together with the user ID and content id. The operator maintains a tracking information metadata database 1410. Other customers can request this metadata from the cloud using a content id and do region or object of interest play based on the downloaded metadata. Tracking related information may also be generated or collected in cloud 1404. For example, the tracking information for a movie may be generated or collected in cloud 1404. The information can include scene change, character labels in the scene, object related info etc. The information is embedded in the video service streams or sent via a side channel as metadata to the player or set top box devices 1402 and 1406 in some embodiments.

Figure 15:
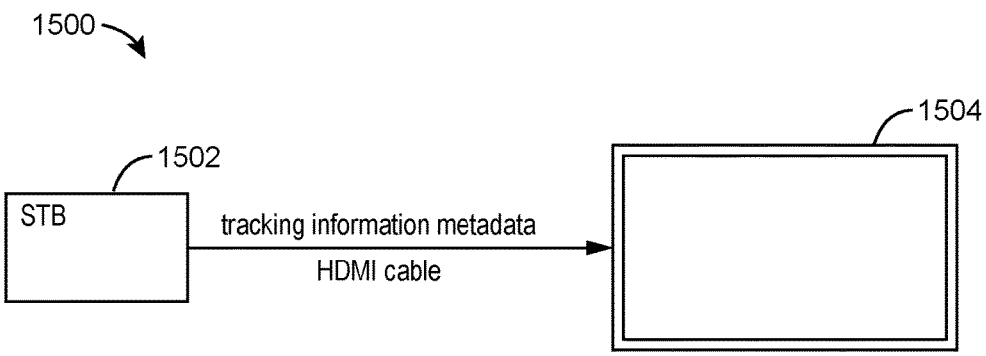
FIG. 15 is a block diagram depicting an exemplary set top box system and television configured for providing enhanced video content, according to some embodiments.

With reference to FIG. 15, a system 1500 includes a set top box device 1502, and monitor 1504. Monitor 1504 is coupled to set top box device 1520 by a high definition media interface cable in some embodiments. Monitor 1504 is a television in some embodiments. Tracking information is sent to the monitor 1504 through the cable as part of the frame metadata. The monitor 1504 uses the information to enhance the video, e.g. highlight the tracking target area, in some embodiments.

In some embodiments, the video processing system 14 provides digital video recorder trick play operations on OOI and ROI. During trick play operations, a direction flag is added to the motion model, which indicates whether the current motion model is in forward or backward direction. During trick play operations, if the direction of the motion model is different from the trick play direction (e.g. if the direction of the motion model is forward, and the user wants to play backward), the motion model is reversed first by multiplying −1 to all motion components and the reversed motion model is used to predict the next object of interest or region of interest.

Figure 16:
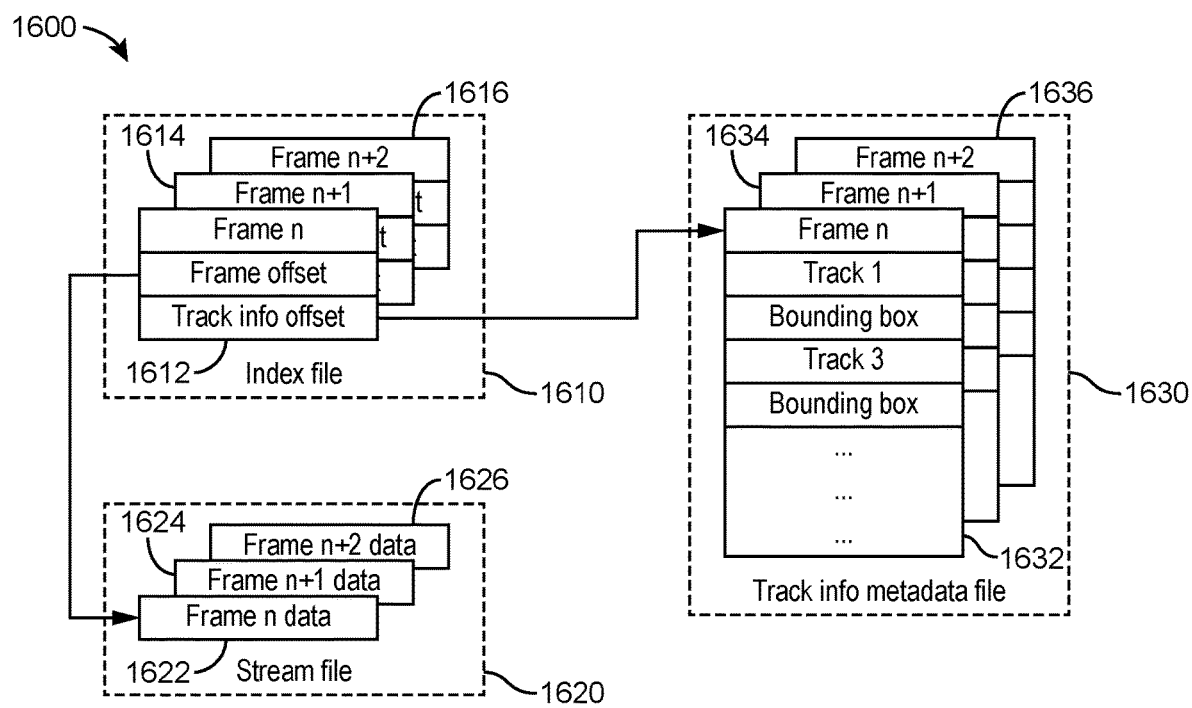
FIG. 16 a block diagram depicting an exemplary sample index format according to some embodiments.

With reference to FIG. 16, an index format 1600 includes an index file 1610, a stream file 1620, and a track information metadata file 1630 in some embodiments. The index format 1600 can be used by video processing system 14 (FIG. 1). The index format 1600 provides a configuration that can be used to quickly locate the corresponding track information in the metadata file 1630 as well as the frame data in the stream file 1620 associated with the video stream. Index format 1600 can be used with video processing system 14 to facilitate the trick play in the 00/ROI mode (e.g., see FIG. 17 below).

The stream file 1620 includes frame n data 1622, frame n+1 data 1624, and frame n+2 data 1626. Frame data 1622, 1624, and 1626 are derived from respective frame n index data 1612, frame n+1 index data 1614, and frame n+2 index data 1614. Each of frame n index data 1612, frame n+1 index data 1614, and frame n+2 index data 1614 includes frame data, frame offset data and track information offset data. Track information metadata file 1630 includes metadata 1632, 1634, and 1636. Each of metadata 1632, 1634, and 1636 include respective includes frame data, track data, and bounding box data for each frame n, n+1 and n+2, etc.

Figure 17:
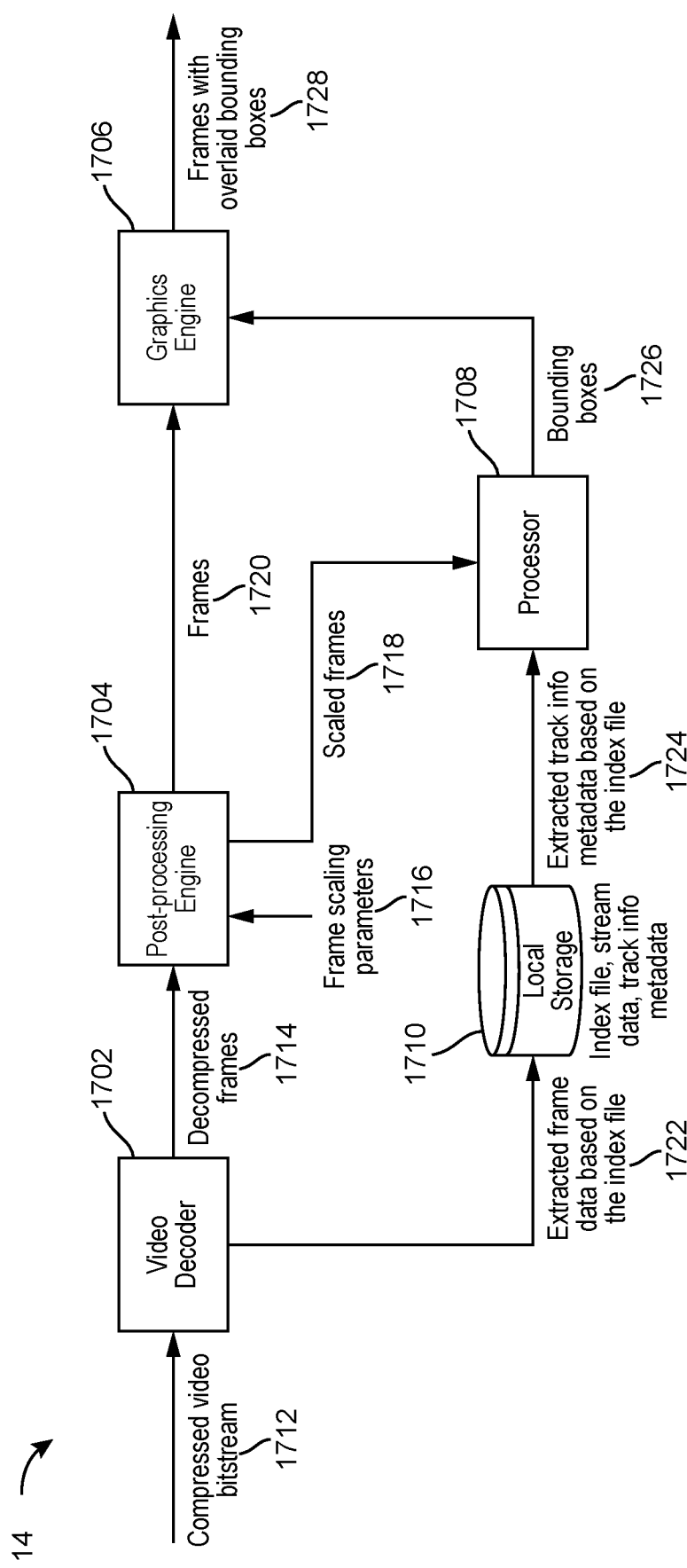
FIG. 17 a block diagram depicting an exemplary video processing system that uses the index format illustrated in FIG. 16 to facilitate the trick play in the OO/ROI mode according to some embodiments.

With reference to FIG. 17, the video processing system 14 is configured to use index file 1610 (FIG. 16) to quickly locate corresponding track information in the metadata file 1630 as well as the frame data 1622 in the stream file 1620. The video processing system 14 includes a video decoder 1702 receiving a compressed data stream 1712, a post-processing engine 1104 receiving decompressed frames 1714, and frame scaling parameters 1716, a host processor 1708 receiving scaled frames 1718 and extracted track information 1724 based upon index file 1610 (FIG. 16), a graphics engine 1706 receiving frames 1720 and bounding boxes 1726, and local storage receiving extracted frame data based upon index file 1610. The local storage stores the stream data (e.g., stream file 1620), the index file 1610, and the metadata file 1630. The video processing system 14 of FIG. 17 is configured to operate in a DVR trick mode on a selected video object with a bounding box in some embodiments. The operation is not only a frame indexing operation, but also object location operation in each frame in some embodiments. The local storage provides the extracted track information based on the index file 1610 to the processor 1708. The video decoder 1702 provides the decompressed frames 1714 and the post processing engine 1704 provides the frames 1720 and the scaled frames 1718. The processor 1708 provides the bounding boxes 1726 using the extracted track information 1724 based upon index file 1610 (FIG. 16).

It should be noted that certain passages of this disclosure may reference terms such as "first" and "second" in connection with devices, mode of operation, frames, streams, objects of interest, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

The invention claimed is:

1. A method, comprising:
providing a first video stream for display;
receiving a user selection of an object of interest; and
providing a second video stream directed to the same video content as the first video stream, wherein the second video stream comprises enhanced video content for the object of interest indicated by the user selection, wherein the second video stream is provided by a graphics engine coupled to a neural network engine, wherein the neural network engine is configured to perform object detection to detect the object of interest in a video frame associated with the first video stream and provide a bounding box for the object of interest, wherein the graphics engine is configured to provide the enhanced video content in response to the bounding box from the neural network engine.

2. The method of claim 1, further comprising:
performing object detection to provide visual indications of potential objects of interest in the first video stream; and
wherein the object of interest is selected using far field voice, push-to-talk, or remote control selection and the visual indications.

3. The method of claim 2, wherein the object detection uses a target location in previous frames to derive a detection region of interest.

4. The method of claim 3, wherein the detection region of interest is used to crop a frame.

5. The method of claim 2, wherein the neural network engine receives and uses sound and direction data, scaled frame, and object filtering parameters to detect potential objects of interest.

6. The method of claim 5, wherein track info metadata is provided, the track info metadata includes a frame number, a track identification number and boundary box coordinates and wherein the neural network engine sends the bounding box and embeddings for target matching.

7. The method of claim 1, wherein an index file includes an offset value for each frame to quickly locate track information in a metadata file.

8. The method of claim 1, wherein the enhanced video content comprises a zoom feature, wherein a level of the zoom feature is selected by a user.

9. The method of claim 1, further comprising providing the enhanced video content is provided in a picture in picture area using a set top box unit, and where the picture in picture area is faded out if the object of interest leaves a scene defined by the first video stream.

10. The method of claim 1, wherein the enhanced video content is an athlete, an actor, scenic feature, or shopping article, wherein the enhanced video content comprises a three dimensional image of the object of interest.

11. The method of claim 1, further comprising:
using a trick play operation when viewing the second video stream, wherein a motion model reversion process is used when a direction of a motion model is different from a trick play direction to predict object of interest position.

12. The method of claim 1, further comprising:
performing object detection to provide visual indications of potential objects of interest in the first video stream; and
providing bit conversion to match a pixel format of the first video stream to an input format of for an object detector used when performing object detection.

13. The method of claim 1, further comprising:
pre-selecting video streams of interest based on a user profile; and
providing the video streams of interest in an electronic program guide.

14. The method of claim 1, further comprising:
using transition detection or object tracking scores to terminate the enhanced video content in response to a scene change or crossfade.

15. The method of claim 1, further comprising:
using homomorphic encryption when tracking information is uploaded to support data analysis in an encrypted domain.

16. The method of claim 1, further comprising:
generating tracking information at edge devices and using a tracking information metadata database indexed by a unique content identification and user identification to share results through a portal.

17. The method of claim 1, further comprising:
providing tracking information metadata to a television through a high definition multimedia interface as part of a frame to allow the television to use the tracking information metadata to provide the enhanced video content.

18. The method of claim 1, further comprising:
receiving an index file for a trick play mode; and
receiving a separate track information metadata file.

19. A video processing system, comprising:
a circuit configured to perform object detection to detect visual indications of potential objects of interest in a video scene, the circuit comprising a processor being configured to receive a selection of an object of interest from the potential objects of interest, and the processor being configured to provide enhanced video content within the video scene for the object of interest indicated by the selection, wherein the circuit comprises a graphics engine coupled to a neural network engine, wherein the neural network engine is configured to perform the object detection and provide a bounding box for the object of interest, wherein the graphics engine is configured to provide the enhanced video content in response to the bounding box from the neural network engine.

20. The video processing system of claim 19, further comprising an interface configured to receive the selection from a user, wherein the selection is provided using a far field voice, push-to-talk, or remote control interface.

21. An entertainment system for providing a video for viewing by a user, the entertainment system comprising:
an interface configured to receive a selection; and
one or more processors, one or more circuits, or any combination thereof configured to:
provide visual indications of potential objects of interest in a video scene;
receive the selection of an object of interest from the potential objects of interest; and
provide enhanced video content within the video scene for the object of interest indicated by the selection, wherein the enhanced video content comprises a zoomed, higher definition, three dimensional or higher contrast image of the object of interest and textual information related to the object of interest, the textual information comprising a parameter related to a current condition of the object of interest in the video scene, wherein the one or more processors comprises a graphics engine coupled to a neural network engine, wherein the neural network engine is configured to perform object detection to detect the object of interest in a video frame associated with the video scene and provide a bounding box for the object of interest, wherein the graphics engine is configured to provide the enhanced video content in response to the bounding box from the neural network engine.

* * * * *